United States Patent [19]

Blond

[11] Patent Number: 4,688,666
[45] Date of Patent: * Aug. 25, 1987

[54] CLUTCH FRICTION DISC

[75] Inventor: Marcel Blond, Savigny-le-Temple, France

[73] Assignee: Valeo, Paris, France

[ * ] Notice: The portion of the term of this patent subsequent to Aug. 5, 2003 has been disclaimed.

[21] Appl. No.: 824,274

[22] Filed: Jan. 30, 1986

[30] Foreign Application Priority Data

Feb. 8, 1985 [FR] France ................................ 85 01761

[51] Int. Cl.⁴ ................................................ F16D 3/66
[52] U.S. Cl. ................................... 192/106.2; 464/63; 464/68
[58] Field of Search .......................... 192/106.2, 106.1; 464/63, 64, 68

[56] References Cited

U.S. PATENT DOCUMENTS

| 4,471,863 | 9/1984 | Lech | 192/106.2 |
| 4,562,913 | 1/1986 | Cucinotta et al. | 464/68 X |
| 4,570,775 | 2/1986 | Caray et al. | 192/106.2 |
| 4,603,767 | 8/1986 | Blond | 192/106.2 |

FOREIGN PATENT DOCUMENTS

| 0047583 | 3/1982 | European Pat. Off. | 192/106.2 |
| 964746 | 5/1957 | Fed. Rep. of Germany | 192/106.2 |
| 1952620 | 7/1978 | Fed. Rep. of Germany | 192/106.2 |
| 2494795 | 5/1982 | France | 192/106.2 |
| 2056019 | 3/1981 | United Kingdom | 192/106.1 |
| 2153490 | 8/1985 | United Kingdom | 464/64 |

Primary Examiner—Rodney H. Bonck
Attorney, Agent, or Firm—Charles E. Brown; Charles A. Brown

[57] ABSTRACT

A clutch plate comprising two torsional damper devices the action of which is staggered. A first of the torsional damper devices has a plurality of washers with one of the washers featuring protrusions whereby the one washer is coupled in rotation to a flange of a second of the dampers. These protrusions are pegs, and use is made of holes provided in the second washer to constrain a friction ring to rotate with the second washer.

10 Claims, 7 Drawing Figures

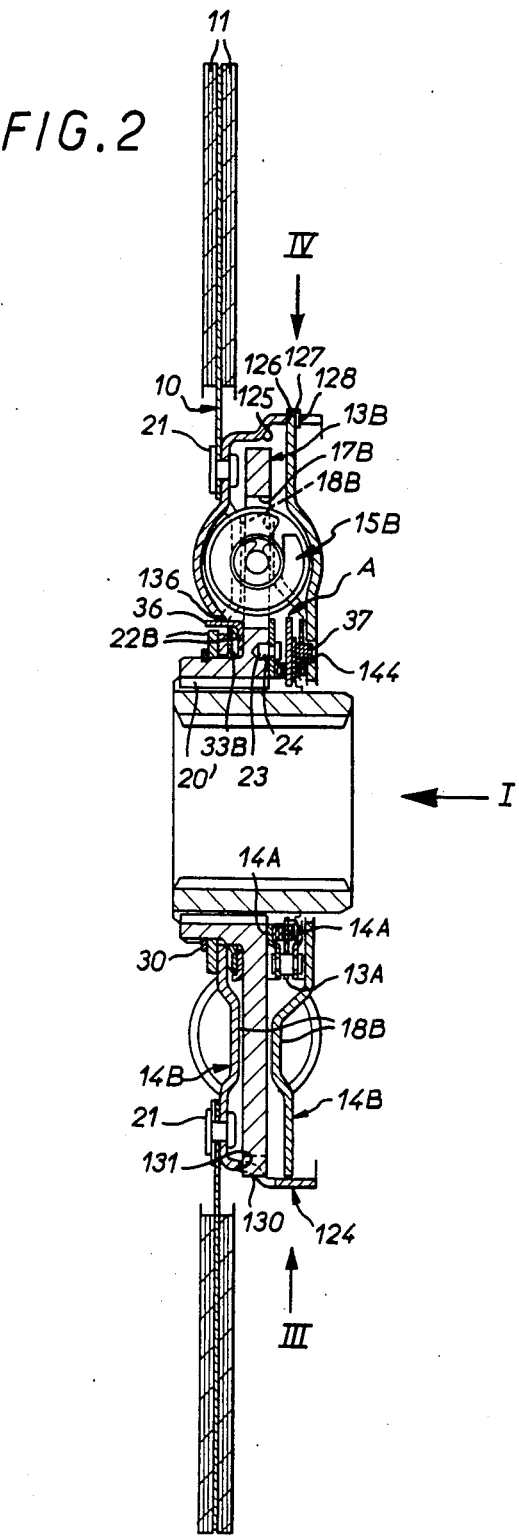
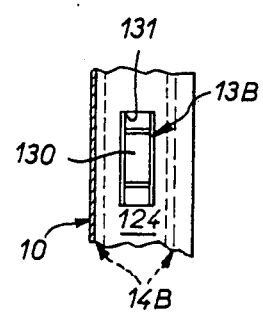
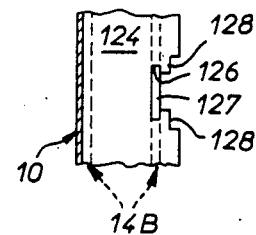

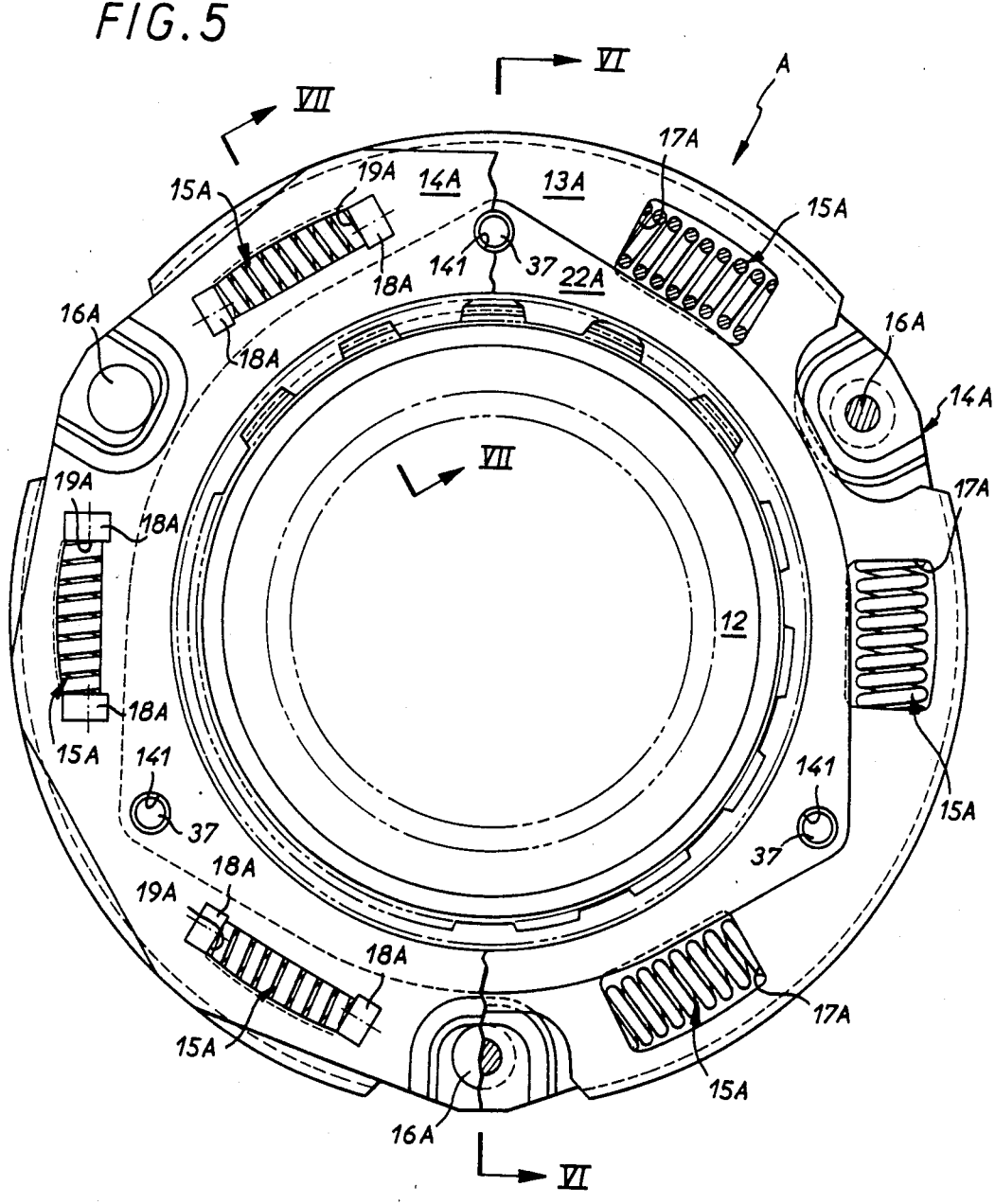

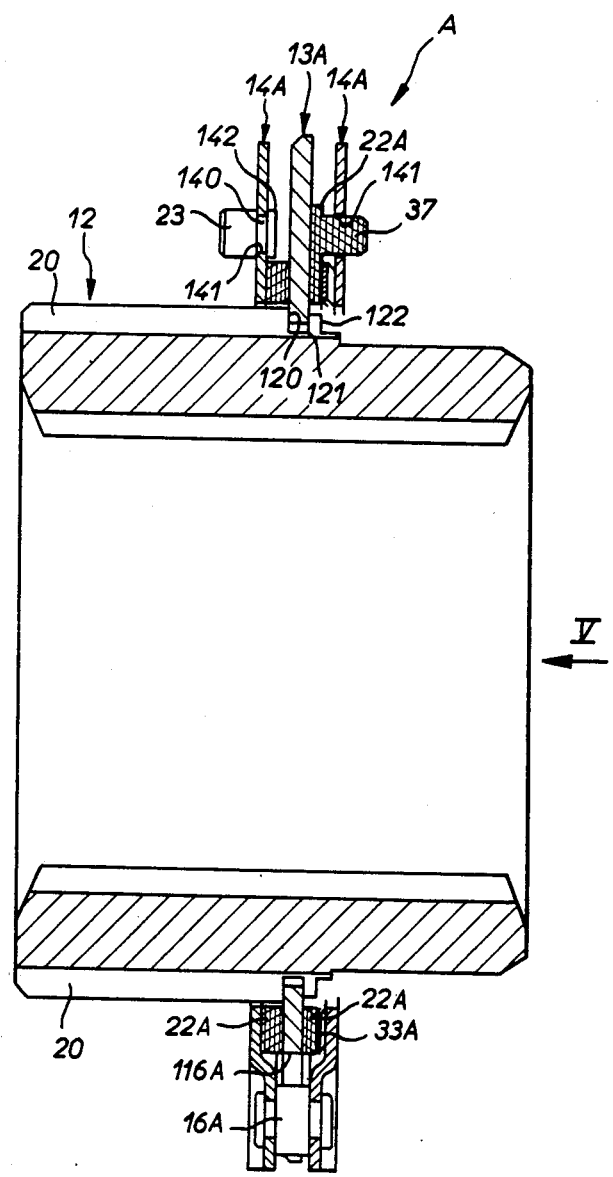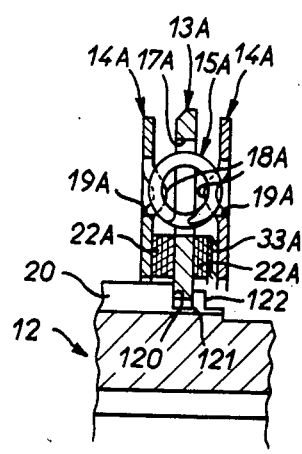

CLUTCH FRICTION DISC

I have described in my U.S. patent application filed Sept. 11, 1984 under Ser. No. 649,289, now U.S. Pat. No. 4,603,767, a clutch plate, especially for automotive vehicles, of the kind comprising a friction facing support and a hub which are movable angularly relative to each other within determined limits of relative angular displacement, the support and the hub being coupled by two torsional damper devices the action of which is staggered and of which one, hereinafter referred to for convenience as the first device, forming so to speak a pre-damper being intended to operate alone for low values of torque, is less strong than the other, referred to hereinafter for convenience as the second device, intended to be operative for more or less high values of said torque, and constitutes an assembly pre-assembled with the hub within this second device, each of these two devices comprising a flange, two washers fastened to each other and disposed axially one on each side of the flange, and elastic means disposed circumferentially between the flange and the washers, the first device being adapted to operate between the hub and the second device, the flange of this first device being rigidly attached to the hub whereas its washers are coupled to the second device, and the flange of said second device being mounted with angular play on the hub whereas its washers are rigidly attached to the friction facing support.

A clutch plate of this kind advantageously has relatively compact overall axial dimensions, whilst being extremely simple to assemble, which is a further advantage.

In one of the embodiments described in this specification one of the washers of the first device comprises, for coupling it to the second device, protrusions which are engaged in indentations in the flange of said second device.

In practice these are cup-shaped protrusions in one piece with the washer that carries them produced by appropriate stamping of the latter.

In my U.S. patent as cited hereinabove, I have also suggested producing these protrusions in the form of pegs appropriately attached to the washer concerned, as by crimping or riveting, for example.

Unlike protrusions formed by stamping, the protrusions thus formed by attached pegs may advantageously be cylindrical, with a circular transverse contour, for example, which, in operation, avoids the possibilitiy of there being formed between them and the indentations in which they are engaged, because of any axial displacement due to inevitable manufacturing and/or assembly tolerances and possible wear of the friction facings, circumferential play prejudicial to their efficacy and/or service life.

In order to attach pegs to one of the washers of the first device in this way by crimping or riveting, it is necessary in practice to provide holes in the washer.

For the usual reasons of standardization, it is advantageous for the two washers of the first device to be identical to each other, which leads to the provision of holes in both these washers.

I therefore asked myself whether it was not possible to make some use of the holes otherwise without any function in one of these washers.

In the usual manner, there are also provided in the first device friction means which, in the usual way, comprises at least one friction ring which is disposed between the flange of the first device and one of its washers; for it to be operative on relative angular displacement between the flange and the washer, this friction ring must be in contact with one of these members and constrained to rotate with the other of them.

In my American patent application Ser. No. 649,289 the friction ring in question is in contact with the washer with which it is associated and is therefore constrained to rotate with the flange.

To achieve this it features spaced axially projecting teats individually engaged in respective windows provided for this purpose in the flange.

Although an arrangement like this is satisfactory, it has the disadvantage of inevitably leading to a certain reduction in the mechanical strength of the flange, which must therefore be designed accordingly.

A general object of the present invention is an arrangement which, already known in itself through the French patent application filed Nov. 25, 1980 under the No. 80 24955 and published under the No. 2.494.795, makes it possible with advantage to protect this flange.

More precisely, an object of the present invention is a clutch plate of the kind comprising a friction facing support and a hub which are movable angularly relative to each other within determined limits of relative angular displacement. The support and the hub are coupled by two torsional damper devices the action of which is staggered. A first one of the devices is less strong than the other, referred to hereinafter as the second device, and constitutes an assembly pre-assembled with the hub within this second device. Each of these two devices comprises a flange. Two washers are fastened to each other and disposed axially one on each side of the flange. Elastic means are disposed circumferentially between the flange and the washers. The first device is adapted to operate between the hub and the second device. The flange of this first device is rigidly attached to the hub whereas its washers are coupled to the second device. The flange of said second device is mounted with angular play on the hub whereas its washers are rigidly attached to the friction facing support. This clutch plate is characterized in that, in combination, one of the washers of the first device comprises protrusions which, for the purpose of coupling the washers of said first device to the second device, are engaged in indentations in the flange of said second device. Said protrusions consist of pegs which are separate from the washer of the first device and appropriately attached thereto by means of holes provided for this purpose in this washer. The first device comprises between its flange and the other of its washers a friction ring. Said washers of said first device are identical to each other. Use is made of the holes of said other washer to constrain said friction ring to rotate with it. This friction ring thus features axially projecting teats each of which is individually engaged in one of said holes in said other washer.

Thus no opening has to be provided in the flange of the first device in order to constrain any friction ring to rotate with it.

It should be emphasized that the arrangement enabling this result to be obtained would not normally occur to those skilled in the art having knowledge of French patent application No. 80 24955 since in the latter the holes provided in the washers are specifically formed there to enable a friction ring to be constrained to rotate with one of them, whereas in my U.S. patent there is even less idea of such rotational attachment in that these washers do not comprise any holes but rather more or less frustoconical stamped protrusions not lending themselves in any way whatsoever to appropriate engagement with the teats that the friction ring features and in that, in my U.S. patent, there is no question of constraining this friction ring to rotate with one of the washers, but only of attaching pegs to one of the latter instead of and in place of the previous stamped protrusions.

The characteristics and advantages of the invention will emerge from the following description given by way of example with reference to the accompanying diagramatic drawings in which:

FIG. 2 is a view of the clutch plate in axial cross-section on the broken line II—II in FIG. 1;

FIGS. 3 and 4 are partial views of the clutch plate in plan-section, respectively according to the arrows III and IV in FIG. 2;

FIG. 5 is a partially cut away view in elevation to a larger scale of the first torsional damper device that this clutch plate comprises, shown in isolation;

FIG. 6 is a view of this first torsional damper device in axial cross-section on the line VI—VI in FIG. 5;

FIG. 7 is another, view of the torsional damper device in axial cross-section on the line VII—VII in FIG. 5.

Figure 1:
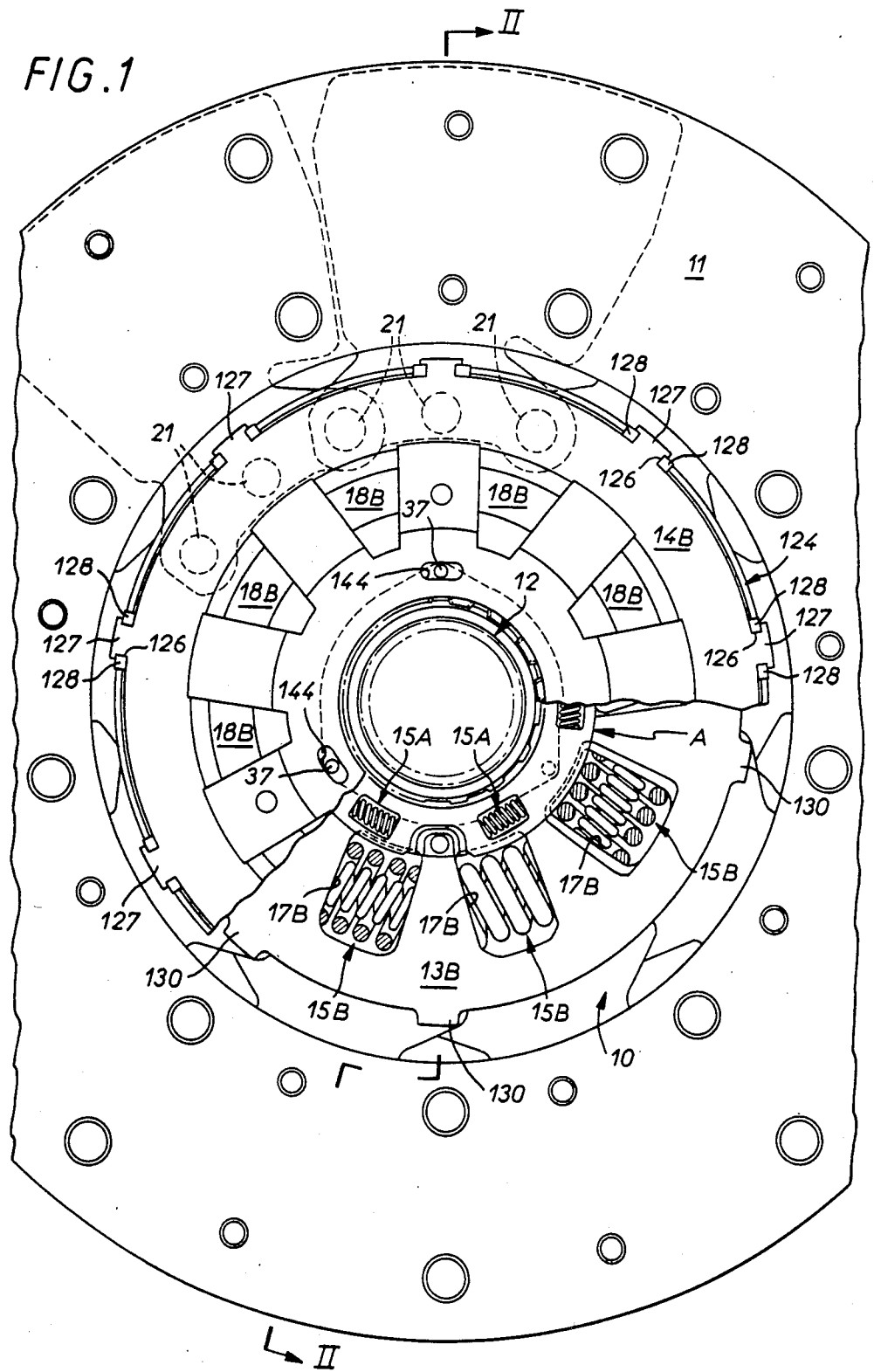
FIG. 1 is a partially cut away partial view in elevation of the clutch plate in accordance with the invention seen in the direction of the arrow I in FIG. 2.

These figures show a clutch plate of the type described in my U.S. patent application Ser. No. 649,289.

The clutch plate, which is in practice intended to equip an automotive vehicle, generally comprises a support 10 for friction facings 11 and a hub 12; the friction facings 11 are adapted to be clamped between two plates of the clutch fixed for rotation with a first shaft, in practice the driving shaft of the vehicle, and the hub 12 is adapted to be constrained to rotate with a second shaft, in practice the input shaft of the gearbox of the vehicle.

In the embodiment shown, the support 10 for the friction facings 11 is made up of a plurality of segments.

Be this as it may, the support 10 and the hub 12 are movable angularly relative to each other within determined limits of relative angular displacement and to this end they are coupled to each other by two torsional damper devices the action of which is staggered, namely a first device A, lower rated than the other, which is designed to operate alone when the torque to be transmitted is very low or nil, and a second device B, of higher rating, intended to operate when this torque is more or less high.

The first device A constitutes an assembly preassembled with the hub 12 within the second device B.

As is see more clearly in FIGS. 5 and 6, it comprises a flange 13A which, as will be described in more detail hereinafter, is fastened at least circumferentially, that is to say in rotation, to the hub 12, two washers 14A which, not fastened to the hub 12, are disposed axially on respective opposite sides of the flange 13A and fastened to each other, elastic means 15A disposed circumferentially between the flange 13A and the washers 14A, and friction means which, as will also be described in more detail hereinafter, are disposed axially between the flange 13A and the washers 14A.

The flange 13A and the washers 14A are generally disposed around the median area of the hub 12.

At its outside periphery the hub 12 has axially projecting splines 20 over part of its length which, in line with the flange 13A, beyond a transverse shoulder 120, are of reduced radial height; at its inside periphery the flange 13A features complementary splines 121 through which it is engaged without play with the reduced radial height portion of the previously mentioned splines.

In the embodiment shown, the flange 13A is thus fastened to the hub 12 not only circumferentially but also axially.

In this embodiment, it is in axial bearing engagement through one of its sides with the transverse shoulder 120 on the splines 20 of the hub 12; on its other side a bead 122 produced by crimping the reduced radial height portion of the splines 20 holds it in axial bearing engagement against said transverse shoulder 120 on these splines.

In the embodiment shown the washers 14A are fastened together by axial pegs 16A passing with clearance through notches 116A provided for this purpose at the periphery of the flange 13A and are riveted to said washers 14A at their ends.

In the embodiment shown the elastic means 15A consist in a circumferential series of one or more sets of springs, a single set in this instance, which are all disposed substantially tangential to a common circumference of the assembly and each of which is individually accommodated in windows 17A in the flange 13A, between stamped portions 18A of the washers 14A themselves forming the circumferential edges of windows 19A formed in the washers 14A.

As for the associated friction means, in the embodiment shown they comprise two friction rings 22A each disposed on a respective side of the flange 13A between the latter and the corresponding washer 14A and they are spring-loaded, a spring washer 33A being for this purpose disposed axially between each friction ring 22A and the corresponding washer 14A.

As shown, this is, for example, a crinkle washer of the type commercially available under the trade name "ONDUFLEX".

In practice, this crinkle washer 33A is provided on the side of the flange 13A axially opposite the support 10 for the friction facings 11.

The second torsional damper device B comprises an L-shaped flange 13B which features splines 20' at its inside periphery and is mounted, through the intermediary of these splines but with angular play, on the splines 20 of the hub 12, two washers 14B disposed on respective opposite sides of the flange 13B, embracing the first device A, and fastened to each other and to the support 10 for the friction facings 11, elastic means 15B disposed circumferentially between the flange 13B and the washers 14B, and friction means operative axially between the flange 13B and the washers 14B.

In the embodiment shown, one of the washers 14B, that disposed axially on the side of the flange 13B opposite the first device A, and also that to which the support 10 for the friction facings 11 is fastened by rivets 21, is in one piece with a ring 124 at its outside periphery, beyond the outside periphery of the associated flange 13B, extending generally axially with a step 125 in its median area, by which it is fastened to the other one.

The ring 124 features spaced notches 126 at its edge forming mortices and, in corresponding relationship to these, the other washer 14B comprises at its outside periphery spaced radially projecting tenons 127; the tenons 127, which are circumferentially complementary to the notches 126, are individually engaged in these notches 126, being held in them by crimping the corresponding edges of the latter, as shown at 128 in FIGS. 1, 2 and 4.

Likewise, in the embodiment shown the flange 13B features at its outside periphery spaced radially projecting tenons 130 and these are individually engaged, with angular play, in openings 131 provided for this purpose in the ring 124 of the washer 14B, in the part of this ring 124 comprising the step 125.

As previously, in the embodiment shown the elastic means 15B consist in one or more circumferential series of one or more sets of springs which, all substantially tangential to a same circumference of the assembly, are individually disposed in windows 17B in the flange 13B, between stamped portions 18B of the washers 14B.

In the embodiment shown two series of such springs are provided and, for staggered operation of the springs, certain are engaged without angular play in the corresponding windows 17B in the flange 13B for the rest configuration of the assembly whereas, for this rest configuration, others are on the contrary engaged with angular play at both ends in the corresponding windows 17B in the flange 13B.

Also, in the embodiment shown two coaxial springs are used in each window 17B in the flange 13B.

Also as previously, the associated friction means comprise two friction rings 22B.

One of them is placed in contact with the flange 13B, on the side thereof axially opposite the first device A.

By means of spaced axially projecting lugs 36 at its outside periphery, it is constrained to rotate with the washer 14B carrying the support 10 of the friction facing 11, each of said lugs 36 passing for this purpose through a hole 136 provided for this purpose in the washer 14B.

The friction ring 22B is in contact with the washer 14B, on the side thereof axially opposite the flange 13B.

As previously, the thus constituted friction means are spring-loaded by a crinkle washer 33B of the type available commercially under the trade name "ONDU-FLEX".

In the embodiment shown, the crinkle washer 33B is disposed axially between that of the friction rings 22B provided with lugs 36 and the washer 14B concerned, and the assembly is retained axially by an elastic ring 30 engaged in a groove provided for this purpose on the axial part of the flange 13B bracing the friction ring 22B, on the opposite side thereof.

The washers 14A of the first device A are coupled in rotation to the second device B, more precisely to the flange 13B thereof.

For coupling it in rotation to the second device B, one of the washers 14A of the first device A, in practice that axially nearer the flange 13B of the second device B, comprises circumferentially spaced protrusions 23 on the side facing said flange 13B, individually engaged in indentations 24 in the flange 13B.

In practice, three protrusions 23 are provided in this way, spaced at 120°, and they consist of pegs which, separate from the washer 14A that carries them, are appropriately attached to the latter.

In the embodiment shown these are cylindrical pegs of circular contour, that is to say pegs whose lateral wall is cylindrical and whose transverse cross-section is circular.

To facilitate their engagement in the indentations 24 in the flange 13B of the second device B, the thus constituted protrusionss 23 are tapered frustoconically at their free end.

Despite the corresponding taper, and as will be noted, the thus produced protrusion 23 are advantageously relatively short in the axial direction, said protrusionss 23 having just sufficient axial length to prevent them escaping from the indentations 24 in the flange 13B of the second device B.

As a corollary to this, these indentations 24 are advantageously relatively shallow, which avoids weakening the flange 13B concerned.

In the embodiment shown, the protrusions 23 are attached by riveting to the washer 14A that carries them, each of them featuring for this purpose a reduced cross-section tail 140 by means of which it is engaged without clearance in a hole 141 of complementary contour provided for this purpose in said washer 14A and which, beyond the latter, is riveted over into contact with the latter at 142 (FIG. 6).

The washer 14A concerned thus has three holes 141 and the same applies to the other washer 14A, said washers 14A being in practice identical to each other for obvious reasons of convenient manufacture.

In accordance with the invention, use is made of the holes 141 that the other washer 14A thus features for constraining the friction ring 22A disposed axially between it and the associated flange 13A to rotate with said other washer 14A.

To achieve this, this friction ring 22A features spaced axially projecting teats 37 in corresponding relationship with the holes 141 in the washer 14A concerned individually engaged with low friction in said holes 141.

To avoid any possibility of interference between it and these teats 37, the nearby washer 14B of the second device B itself features, in corresponding relationship to said teats 37, circumferentially elongate slots 144 (FIGS. 1 and 2) in which said teats 37 are individually engaged.

Thus in the embodiment shown the washer 14A of the first device A with which a friction ring 22A is constrained to rotate is that axially farther from the flange 13B of the second device B.

If required, the corresponding teats 37 may serve to center the associated corrugated elastic washer 33A and, likewise, the rivet heads 142 of the protrusions 23 may serve to center the corresponding friction ring 22A.

To assemble the thus constituted clutch plate, an assembly formed by the hub 12 and the first device A is first pre-assembled and then the second device B is assembled, enclosing within it the first device A.

In service, when the torque to be transmittd is low, only the first device A is operative; subsequently, the corresponding elastic means 15A becoming saturated, the second device B becomes operative in turn when the torque is higher.

In either case the corresponding angular displacement, firstly between the washers 14A of the first device A and the flange 13A of the latter, and then between the washers 14A of the second device B and the flange 13B of the latter, is limited by abutment means.

These may, for example, be the corresponding elastic means 15A, 15B, the turns of at least one of the springs constituting them then being contiguous.

Also, and as will have been understood, the indentations 24 in the flange 13B of the second device B in which are engaged the protrusions 23 carried by the corresponding washer 13A of the first device A are cylindrical, with a circular contour, like said protrusions 23.

The present invention is of course not limited to the embodiment described and shown, but encompasses any variant execution.

What I claim is:

1. Clutch plate of the kind comprising a friction facing support and a hub which are movable angularly relative to each other within determined limits of relative angular displacement, the support and the hub being coupled by two torsional damper devices the action of which is staggered and of which one, hereinafter referred to as the first device, is less strong than the other, referred to hereinafter as the second device, and constitutes an assembly pre-assembled with the hub within this second device, each of these two devices comprising a flange, two washers fastened to each other and disposed axially one on each side of the flange, and elastic means disposed circumferentially between the flange and the washers, the first device being adapted to operate between the hub and the second device, the flange of the first device being rigidly attached to the hub whereas its washers are coupled to the second device, and the flange of the second device being mounted with angular play on the hub whereas its washers are rigidly attached to the friction facing support, the improvement whereby one of the washers of the first device comprises protrusions which, for the purpose of coupling the washers of said first device to the second device, are engaged in indentations in the flange of said second device, said protrusions are in the form of pegs which are separate from said washer of the first device and appropriately attached thereto by means of holes provided for this purpose in this washer, the first device comprises between its flange and the other of its washers a friction ring, said washers of said first device are identical to each other, and use is made of the holes that said other washer of the latter also features by virtue of this fact in order to constrain said friction ring to rotate with it, this friction ring featuring for this purpose axially projecting teats each of which is individually engaged in one of said holes in said other washer.

2. Clutch plate according to claim 1, wherein the washer of the first device with which the friction ring is constrained to rotate is that axially farther from the flange of the second device.

3. Clutch plate according to claim 2, wherein an elastic washer is axially disposed between the friction ring and the corresponding washer of the first device and the teats of said friction ring serve to center said elastic washer.

4. Clutch plate according to claim 2, wehrein said protrusions have rivet heads, a friction ring is also provided on the other side of the flange of the first device between this flange and the corresponding washer, and the rivet heads of protrusions that this washer features serve to center this friction ring.

5. Clutch plate according to claim 2, wherein the washer of the second device near the friction ring has slots in corresponding relatioship to the teats of the latter in which said teats are individually engaged.

6. Clutch plate according to claim 5, wherein an elastic washer is axially disposed between the friction ring and the corresponding washer of the first device and the teats of said friction ring serve to center said elastic washer.

7. Clutch plate according to claim 5, wherein said protrusions have rivet heads, a friction ring is also provided on the other side of the flange of the first device between this flange and the corresponding washer, and the rivet heads of protrusions that this washer features serve to center this friction ring.

8. Clutch plate according to claim 1, wherein an elastic washer is axially disposed between the friction ring and the corresponding washer of the first device and the teats of said friction ring serve to center said elastic washer.

9. Clutch plate according to claim 8, wherein said protrusions have rivet heads, a friction ring is also provided on the other side of the flange of the first device between this flange and the corresponding washer, and the rivet heads of protrusions that this washer comprises serve to center this friction ring.

10. Clutch plate according to claim 1, wherein said protrusions have rivet heads, a friction ring is also provided on the other side of the flange of the first device between this flange and the corresponding washer, and the rivet heads of protrusions that this washer features serve to center this friction ring.

* * * * *